No. 726,077. PATENTED APR. 21, 1903.
L. LEHOTZKY.
HOSE COUPLING.
APPLICATION FILED DEC. 8, 1902.
NO MODEL.
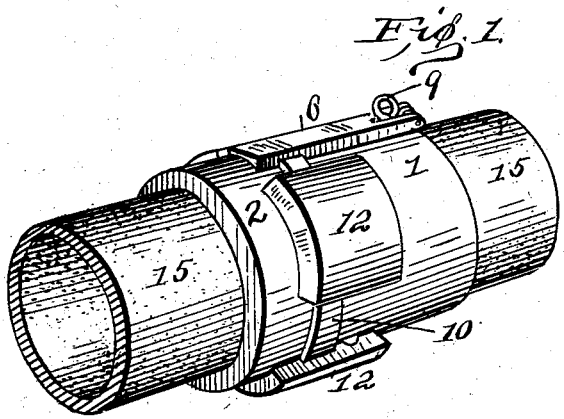
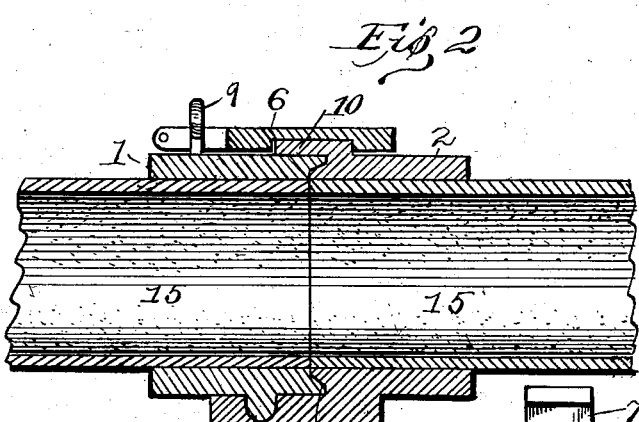
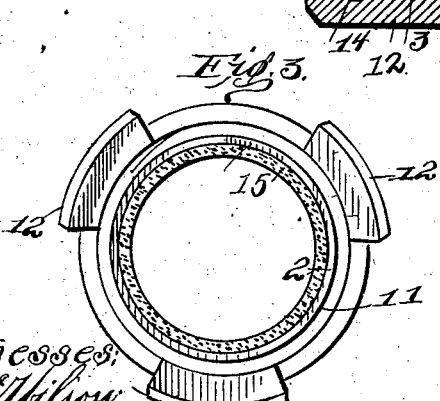
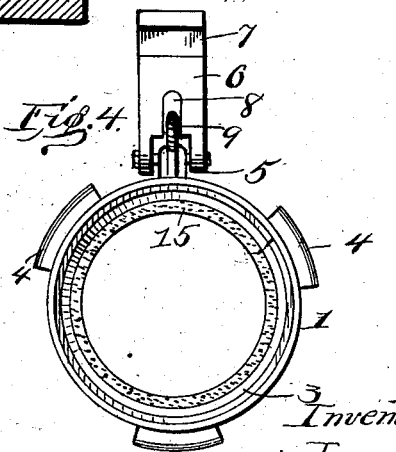
Witnesses:
D. C. Wilson.
E. E. Potter.
Inventor
Lorentz Lehotzky,
By H. C. Everett
Attorneys

UNITED STATES PATENT OFFICE.

LORENTZ LEHOTZKY, OF McKEESPORT, PENNSYLVANIA.

HOSE-COUPLING.

SPECIFICATION forming part of Letters Patent No. 726,077, dated April 21, 1903.

Application filed December 8, 1902. Serial No. 134,396. (No model.)

*To all whom it may concern:*

Be it known that I, LORENTZ LEHOTZKY, a citizen of the United States of America, residing at McKeesport, in the county of Allegheny and State of Pennsylvania, have invented certain new and useful Improvements in Hose-Couplings, of which the following is a specification, reference being had therein to the accompanying drawings.

This invention relates to certain new and useful improvements in hose-couplers; and the main object of the invention is to provide novel and effective means for easily and quickly joining two sections of hose together.

This invention is particularly adapted for use in connection with fire-hose, though is by no means limited to such use, as it may be employed in any connection where it is desired to quickly and effectively join two sections of hose together.

Briefly described, the invention comprises a male and a female section. The female section is provided at its abutting end with a metallic collar integral with the section, and within this collar is an annular seat which receives a projection or annular flange on the male section. The female section is also provided with a plurality of projecting lugs extending beyond the abutting end of the member and provided on their underneath concave faces with grooves. The male member is provided on its periphery adjacent its abutting end with flanges, which are adapted to enter the grooves of the lugs on the female section. After the sections have been secured together by a partial turn of one or the other of the sections, so as to interlock the flanges of the male sections with the lugs of the female section, the two sections or members are held against accidental displacement by a pivoted latch carried by the male section and when closed engage the collar of the female section.

All of the above construction will be hereinafter more specifically described and then particularly pointed out in the appended claims, and in describing the invention in detail reference will be had to the accompanying drawings, forming a part of this specification, and wherein like numerals of reference will be employed for indicating like parts throughout the several views, in which—

Figure 1 is a detail perspective view of my improved hose-coupler. Fig. 2 is a central longitudinal sectional view of the coupler in the coupled position, the hose being broken away. Fig. 3 is a detached end view of the female section; and Fig. 4 is a like view of the male section or member, showing the pivoted latch in the elevated position.

As stated, the invention embodies a male section or member 1 and a female section or member 2. The male section or member 1 is chamfered on its abutting end to form an annular projection or flange 3 and is provided on its periphery adjacent to the abutting end with a plurality of flanges 4, curved to conform to the arc of the member. This male section or member has mounted on its periphery, near its outer end, a lug or post 5, to which is pivotally secured the bifurcated end of a latch 6, provided on its underneath face, near its free end, with a notch or groove 7. The slot in the pivoted end of the latch 6 is of sufficient length to permit the entrance through said slot 8 of a turn-key 9, mounted for rotation in the male section or member adjacent to the lug or post 5, whereby it may be turned so as to bring the head of the key in alinement with the slot 8 to disengage the latch 6; and when the latch is closed the key is turned so as to bring the head transverse to the slot 8, and thus hold the latch in the locked position.

The female section 2 is provided at its abutting end with an annular integral collar 10, provided with an interior annular groove 11 to receive the projecting flange or annular tongue 3 of the male section or member. This female section or member is provided on its abutting end with a plurality of projecting lugs corresponding to the number of flanges 4 on the male section or member, these projecting lugs 12 being formed integral with the collar 10 and hence lying above the plane of the section or member 1, so that the latter may be received within the lugs 12. These lugs 12 are each provided on the underneath face with a curved groove or slot 14 to receive the curved flanges 4 of the male section or member 1.

In operation the sections or members are joined together by matching the same, so that the flanges 4 will enter between the lugs 12, and thus permit the flange or tongue 3 to enter the groove or recess 11, provided therefor in the female section. One or the other of the sections is then partially revolved or both sections or members are revolved in opposite directions, causing the flanges 4 to engage in the grooves of the projecting lugs 12, and thus lock the two sections or members together. The pivoted latch 6, which has been elevated prior to engagement of the sections or members, is then closed down, the collar 10 fitting in the groove or notch 7, and the key 9 is then turned transversely of the latch, so as to hold the latter in the locked position. The hose 15 is secured in the sections in any suitable or desired manner.

It will be observed that the coupling is easily and quickly effected and when made a perfectly water-tight joint is assured.

While the invention has been described in detail as to the construction, yet it will be evident that various slight changes may be made without departing from the general spirit of my invention.

Having fully described my invention, what I claim as new, and desire to secure by Letters Patent, is—

1. A coupling comprising a male and a female member, a ring on the female member extending beyond the end of the hose-section thereof and engaging the periphery of the end of the male member, a latch pivoted to the male member and having the under face of its free end cut away to receive said ring, and means to lock said latch.

2. A coupling comprising a male and female member, the male member having flanges, and the female member having lugs receiving said flanges, a ring on the female member engaging the end of the male member and a pivoted latch on the male member extending between two of said lugs and cut away to receive said ring, and means to secure said latch in engagement with said ring.

In testimony whereof I affix my signature in the presence of two witnesses.

LORENTZ LEHOTZKY.

Witnesses:
A. M. WILSON,
E. E. POTTER.